United States Patent
Tochizawa

[19]

[11] Patent Number: 6,009,863
[45] Date of Patent: Jan. 4, 2000

[54] POSITIVE CRANKCASE VENTILATION APPARATUS

[75] Inventor: Tooru Tochizawa, Tochigi-ken, Japan

[73] Assignee: Honda Giken Kogyo Kabushiki Kaisha, Tokyo, Japan

[21] Appl. No.: 09/161,831

[22] Filed: Sep. 29, 1998

[30] Foreign Application Priority Data

Oct. 20, 1997 [JP] Japan ................................... 9-287196

[51] Int. Cl.⁷ ............................ F01M 13/00; F02M 35/10

[52] U.S. Cl. ....................................... 123/572; 123/184.47

[58] Field of Search .................................. 123/572, 573, 123/574, 184.34, 184.42, 184.47

[56] References Cited

U.S. PATENT DOCUMENTS

| | | | |
|---|---|---|---|
| 4,066,055 | 1/1978 | Hager | 123/572 |
| 5,069,192 | 12/1991 | Matsumoto et al. | 123/572 |
| 5,209,191 | 5/1993 | Kopec | 123/572 |

*Primary Examiner*—Marguerite McMahon
*Attorney, Agent, or Firm*—Armstrong, Westerman, Hattori, McLeland & Naughton

[57] ABSTRACT

A cylinder head and an intake manifold are integrated together. A positive crankcase ventilation (PCV) valve is fitted via a single grommet into a penetrating hole which is formed in an inner wall which partitions the space inside the cylinder head and a surge tank of the intake manifold. In that outer wall of the intake manifold which lies opposite to the penetrating hole, there is formed an opening which can be closed with a cap member. The PCV valve is detachably fitted into the penetrating hole through the opening.

6 Claims, 3 Drawing Sheets

POSITIVE CRANKCASE VENTILATION APPARATUS

BACKGROUND OF THE INVENTION

1. Field of the Invention

The present invention relates to a positive crankcase ventilation apparatus which circulates or returns blowby gas from an engine head cover to a surge tank of an intake manifold via a positive crankcase ventilation (PCV) valve.

2. Description of the Related Art

Conventionally, as this kind of apparatus, the following is known. Namely, a PCV valve is mounted or fitted in a penetrating hole which is formed in a head cover. The PCV valve and a circulation port which is formed in a surge tank of an intake manifold are connected together by a blowby gas hose. In this arrangement, the blowby gas hose must be provided, resulting in a higher cost. In addition, the blowby gas hose is exposed to the outside or the external appearance and, therefore, the value of the engine is impaired from an aesthetical viewpoint.

As a solution, the following is known in Japanese Published Unexamined Patent Application No. 229221/1994. Namely, a bottom surface of a surge tank of an intake manifold is arranged to lie close to an upper surface of a head cover. A base end portion of a PCV valve is fitted into a penetrating hole which is formed in the upper surface of the head cover. A top end portion of the PCV valve is fitted into a penetrating hole which is formed in the bottom surface of the surge tank.

In the latter of the above-described prior art, a blowby gas hose becomes needless. It is, however, necessary to attach a grommet for sealing purpose both in the penetrating hole in the head cover and in the penetrating hole in the surge tank. This necessity is a problem in an attempt for further cost reduction. Further, the intermediate portion of the PCV valve is exposed to the external appearance through the clearance between the surge tank and the head cover. Therefore, the quality of the engine from the aesthetic viewpoint has not been completely improved. Still furthermore, if the penetrating hole on the head cover side and the penetrating hole on the surge tank side are not aligned with each other, the PCV valve cannot be successfully fitted in the penetrating holes. To secure a successful fitting of the PCV valve, the machining accuracy of both the penetrating holes is required, resulting in a higher cost.

In view of the above points, the present invention has an object of providing a positive crankcase ventilation apparatus in which the cost and the aesthetic appearance are improved to the maximum extent possible.

SUMMARY OF THE INVENTION

In order to attain the above and other objects, the present invention is a positive crankcase ventilation apparatus for circulating blowby gas from a head cover of an engine to a surge tank of an intake manifold via a positive crankcase ventilation (PCV) valve, wherein the head cover and the intake manifold are integrally formed, wherein a penetrating hole is formed in an inner wall which partitions a space inside the head cover and the surge tank, and wherein the PCV valve is fitted into the penetrating hole.

According to the present invention, by integrating the head cover and the intake manifold, the space inside the head cover and the surge tank lie side by side with an inner wall in between. Since the PCV valve is fitted into the penetrating hole formed in this inner wall, there is required only a single grommet for sealing purpose. In addition, the PCV valve does not appear at all to the external appearance. Further, there is required only one penetrating hole for fitting thereinto the PCV valve. Therefore, unlike in the conventional art, it is not necessary any more to secure the alignment between the penetrating hole on the side of the head cover and the penetrating hole on the side of the surge tank. The machining of the penetrating hole therefore becomes easy. The cost can thus be reduced to the lowest extent possible, and the value of the engine as a commercial commodity is improved from the aesthetical viewpoint.

Further, if an opening capable of being closed with a cap member is formed in that outer wall portion of the intake manifold which lies opposite to the penetrating hole such that the PCV valve is detachably fitted into the penetrating hole through the opening, it becomes possible to remove the PCV valve only by removing the cap member. Further, it becomes possible to confirm the presence or absence of accumulated matters such as oil, water, or the like inside the intake manifold and to remove the accumulated matters through the opening. The ease with which the maintenance of the engine is performed is improved. In this case, if the penetrating hole and the opening are formed in a central portion, as seen in the longitudinal direction, of the surge tank, it advantageously becomes easier to confirm the presence or absence of, as well as the removal of, the accumulated matters.

In case the penetrating hole and the opening are formed in the central portion, as seen in the longitudinal direction, of the surge tank, if an annular projection portion which serves as a portion for mounting thereon the cap member is formed in the circumference of the opening, the projection advantageously contributes to the increase in the rigidity in the central portion of the surge tank. In case the cap member is fitted with fastening members such as bolts or the like, a pair of fastening bosses for screwing thereinto tightening members for the cap member are formed in the circumference of the opening, one of the bosses being located on a side of connection between the surge tank and an introduction pipe of the intake manifold, the other of the bosses being located on a side of connection between the surge tank and branched pipes of the intake manifold. Then, by utilizing both the connecting portions of high rigidity, the cap member can advantageously be mounted with high rigidity. Particularly, in case the cap member is arranged to serve a dual purpose other than as the cap itself, or in case another part is mounted on the cap member, a mounting rigidity of the cap member must be high. Therefore, the fastening boss portion shall preferably be formed as described above.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF PREFERRED EMBODIMENTS

Figure 1:
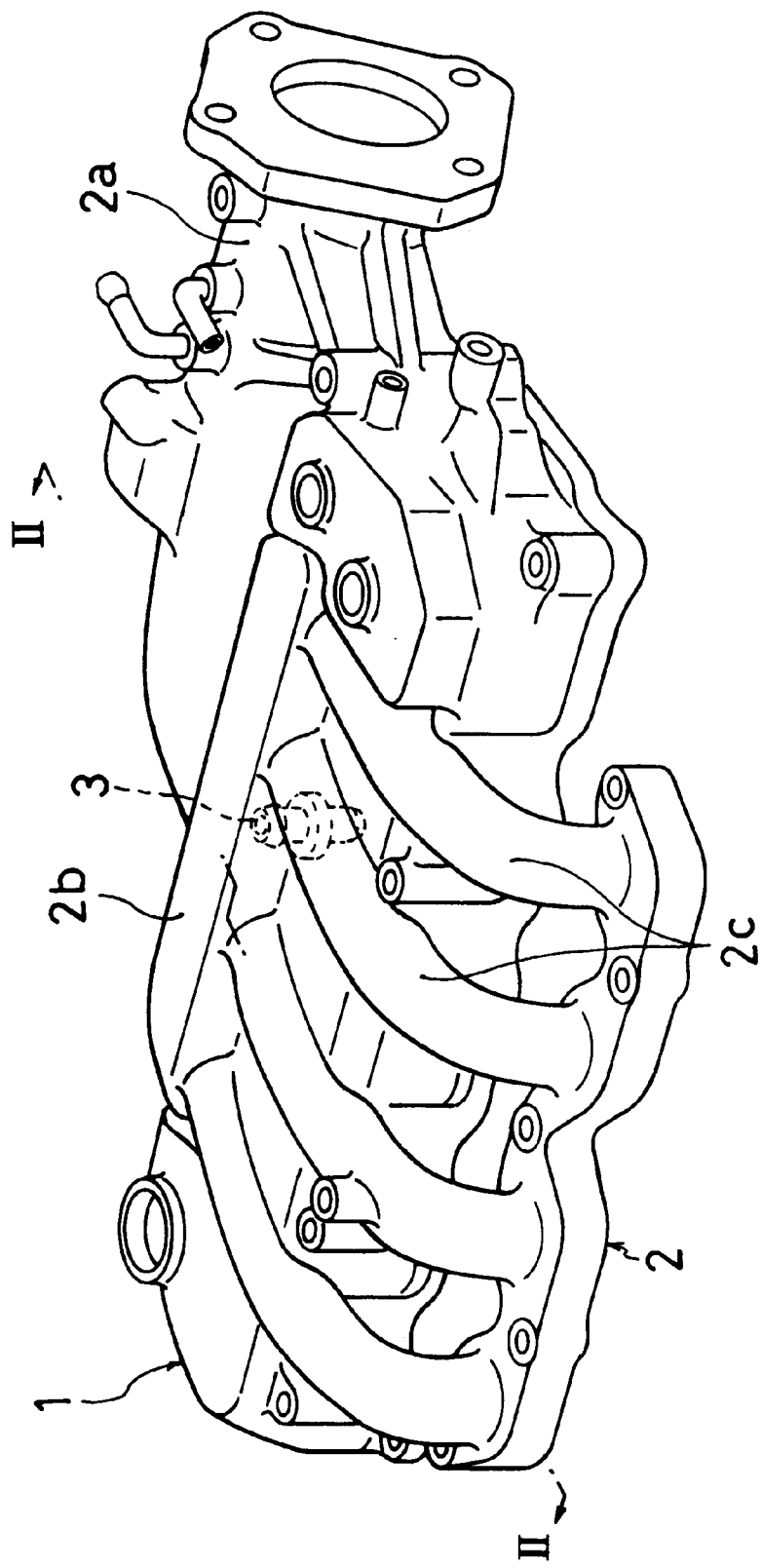
FIG. 1 is a perspective view of a first embodiment of the positive crankcase ventilation apparatus of the present invention.

With reference to FIG. 1, reference numeral 1 denotes a head cover of an engine. An intake manifold 2 is arranged integrally with the head cover 1. The intake manifold 2 is constituted by an introduction pipe 2a which is connected to a throttle body (not illustrated), a surge tank 2b which is elongated in the direction in which engine cylinders are arranged, and a plurality of branched pipes 2c which are branched from the surge tank 2b. Each of the branched pipes 2c is connected to each of intake ports which are formed in a cylinder head (not illustrated).

Figure 2:
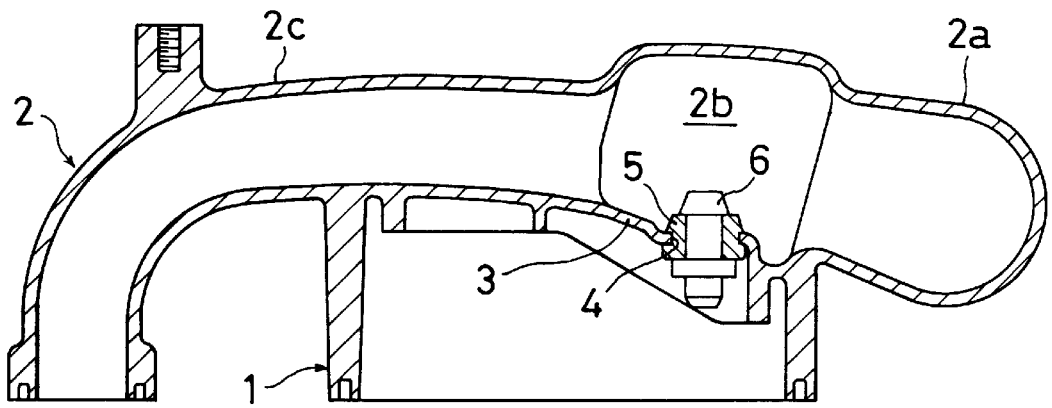
FIG. 2 is a sectional view taken along the line II—II in FIG. 1.

As shown in FIG. 2, the space inside the head cover 1 and the surge tank 2b are partitioned by a single inner wall 3 which serves as a bottom wall of the surge tank 2b. A penetrating hole 4 is formed in the inner wall 3, and a grommet 5 made of rubber is fitted into the penetrating hole 4. A positive crankcase ventilation (PCV) valve 6 which adjusts the circulation amount of the blowby gas depending on the intake negative pressure is inserted into the grommet 5 from the side of the head cover 1, i.e., from the lower side upward. The PCV valve 6 is thus hermetically fitted into the penetrating hole 4 via the grommet 5. In this manner, the blowby gas is circulated from the space inside the head cover 1 to the surge tank 2b via the PCV valve 6.

According to the above-described arrangement, the parts required for the positive crankcase ventilation apparatus are limited to only the PCV valve 6 and a single grommet 5. In addition, it becomes needless to secure an alignment between the penetrating hole on the side of the cylinder head and the penetrating hole on the side of the surge tank, which was the case with the conventional art. As a result, the machining of the penetrating hole 4 becomes easy and the cost can be reduced to the best extent possible. Further, the parts for the positive crankcase ventilation apparatus do not appear to the external appearance, with the result that the value of the engine as seen from the aesthetical viewpoint is improved to the maximum extent possible.

Figure 4:
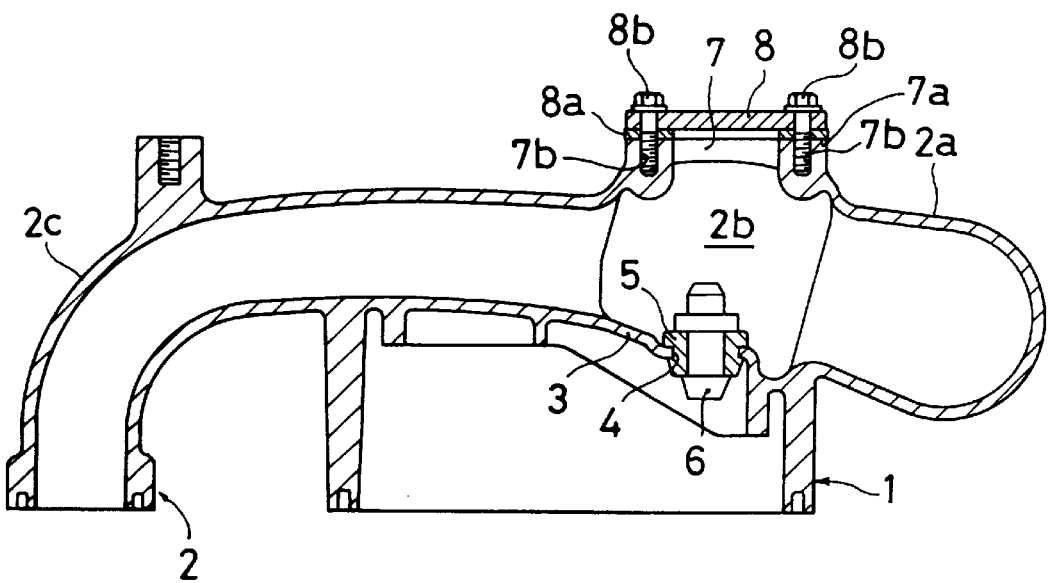
FIG. 4 is a sectional view taken along the line IV—IV in FIG. 3 in a state in which the apparatus is assembled.
Figure 3:
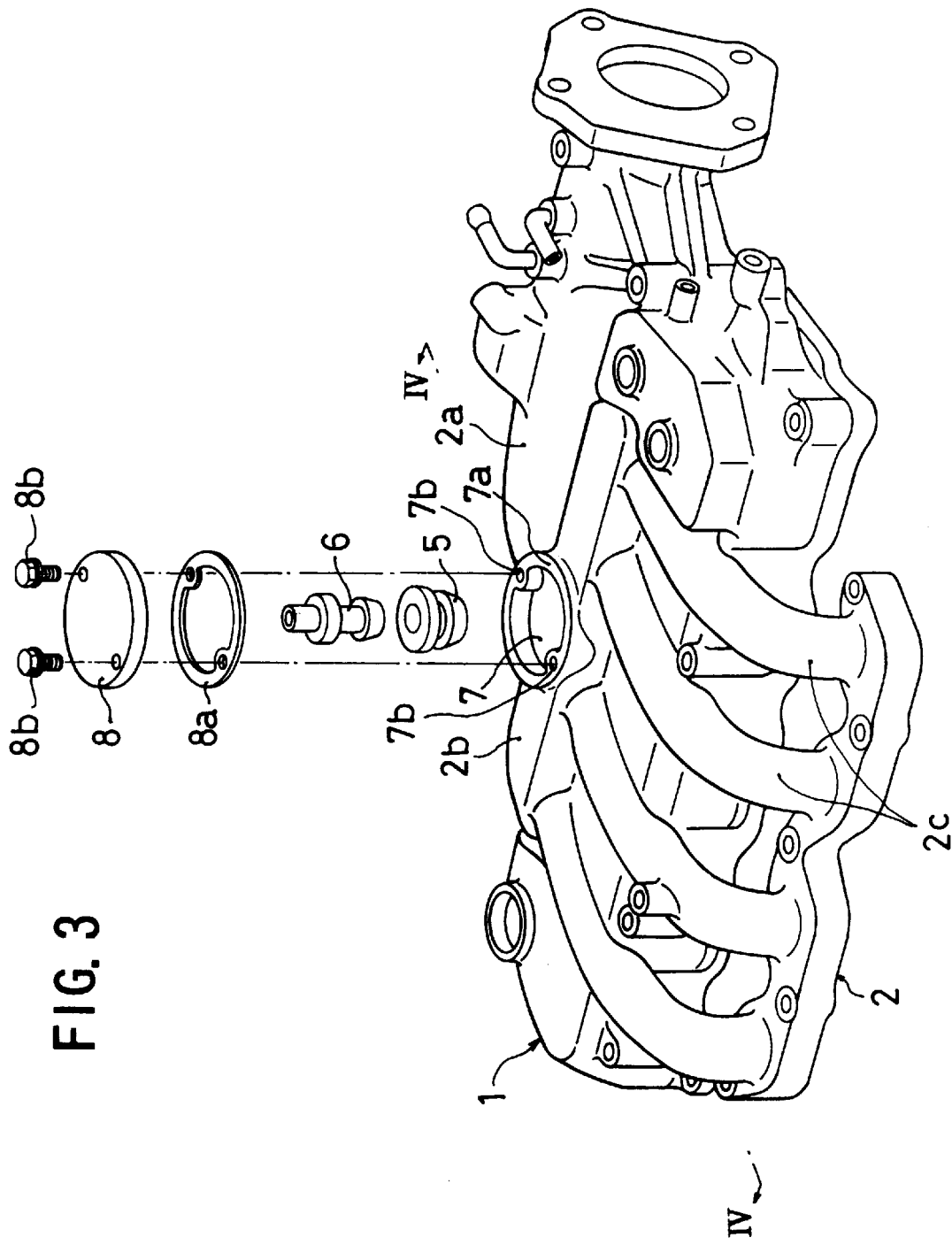
FIG. 3 is an exploded perspective view of a second embodiment of the apparatus of the present invention.

FIGS. 3 and 4 show a second embodiment of the present invention. The same reference numerals have been attached to the same parts as the above-described first embodiment. In the second embodiment, an opening 7 is formed in that part of an outer wall portion which lies opposite to the penetrating hole 4 in the intake manifold 2. The PCV valve 6 is thus arranged to be detachably mounted into the penetrating hole 4 from the upper side through the opening 7. The opening 7 is normally hermetically closed by a cap member 8 with a packing 8a.

In the first embodiment, the PCV valve 6 cannot be replaced without removing the head cover 1 from the cylinder head. In the second embodiment, on the other hand, the PCV valve 6 can be replaced by simply removing the cap member 8, thereby improving the ease with which the maintenance can be performed.

Further, the presence or absence of accumulated matters such as oil, water, or the like inside the intake manifold 2 can be confirmed through the opening 7. The accumulated mattes can also be removed through the opening 7. In this respect, too, the ease with which the maintenance can be performed is superior. Still furthermore, in the second embodiment, the opening 7 is formed in the central portion, as seen in the longitudinal direction, of the surge tank 2b to further facilitate the confirmation and removal of the accumulated matters.

In the second embodiment, in the circumference of the opening 7 there are formed: an annular projection 7a which serves as the mounting portion of the cap member 8; and a pair of fastening bosses 7b, 7b. One of the fastening bosses 7b, 7b is located on that circumferential side of the projection 7a which lies on the connecting portion between the surge tank 2b and the introduction pipe 2a. The other of the fastening bosses 7b, 7b is located on the circumferentially opposite side of the projection 7a which lies on the connecting portion between the surge tank 2b and the branched pipes 2c. The cap member 8 is mounted on the projection 7a by means of a pair of fastening members 8b, 8b which are screwed into both the fastening bosses 7b, 7b. According to this arrangement, the projection 7a contributes to the augmented rigidity in the central portion of the surge tank 2b. Further, since each of the fastening bosses 7b, 7b is located near the above-described each of the connecting portions of high rigidity, the cap member 8 can be mounted with a high rigidity by making use of the rigidity of each of the connecting portions.

As is clear from the above-described explanations, according to the present invention, the number of parts for the positive crankcase ventilation apparatus can be reduced, and the machining work of the penetrating hole becomes easy. The cost is thus reduced to the lowest possible level. In addition, since the parts for the positive crankcase ventilation apparatus do not appear at all to the external appearance, the value of the engine as a commercial commodity can be improved to the maximum extent possible.

It is readily apparent that the above-described positive crankcase ventilation apparatus meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A positive crankcase ventilation apparatus for circulating blowby gas from a head cover of an engine to a surge tank of an intake manifold via a positive crankcase ventilation (PCV) valve, wherein the head cover and the intake manifold are integrally formed, wherein a penetrating hole is formed in an inner wall which partitions a space inside the head cover and the surge tank, and wherein the PCV valve is fitted into the penetrating hole.

2. A positive crankcase ventilation apparatus according to claim 1, wherein an opening capable of being closed with a cap member is formed in that outer wall portion of the intake manifold which lies opposite to the penetrating hole such that the PCV valve is detachably fitted into the penetrating hole through the opening.

3. A positive crankcase ventilation apparatus according to claim 2, wherein the penetrating hole and the opening are formed in a central portion, as seen in the longitudinal direction, of the surge tank.

4. A positive crankcase ventilation apparatus according to claim 3, wherein an annular projection which serves as a portion for mounting thereon the cap member is formed in the circumference of the opening.

5. A positive crankcase ventilation apparatus according to claim 3, wherein a pair of fastening bosses for screwing thereinto tightening members for the cap member are formed in the circumference of the opening, one of the bosses being located on a side of connection between the surge tank and an introduction pipe of the intake manifold, the other of the bosses being located on a side of connection between the surge tank and branched pipes of the intake manifold.

6. A positive crankcase ventilation apparatus according to claim 1, wherein the PCV valve is fitted into the penetrating hole via a single grommet.

* * * * *